(12) United States Patent
Tang et al.

(10) Patent No.: US 9,110,322 B2
(45) Date of Patent: Aug. 18, 2015

(54) LCD MODULE AND ASSEMBLING METHOD THEREOF

(71) Applicant: SHENZHEN CHINA STAR OPTOELECTRONICS TECHNOLOGY CO., LTD, Shenzhen (CN)

(72) Inventors: Guofu Tang, Shenzhen (CN); Yuchun Hsiao, Shenzhen (CN)

(*) Notice: Subject to any disclaimer, the term of this patent is extended or adjusted under 35 U.S.C. 154(b) by 343 days.

(21) Appl. No.: 13/807,743

(22) PCT Filed: Dec. 24, 2012

(86) PCT No.: PCT/CN2012/087247
§ 371 (c)(1),
(2) Date: Dec. 30, 2012

(87) PCT Pub. No.: WO2014/089878
PCT Pub. Date: Jun. 19, 2014

(65) Prior Publication Data
US 2014/0168563 A1    Jun. 19, 2014

(30) Foreign Application Priority Data

Dec. 14, 2012  (CN) .......................... 2012 1 0544127

(51) Int. Cl.
*G02F 1/1333* (2006.01)
(52) U.S. Cl.
CPC .................. *G02F 1/133308* (2013.01); *G02F 2001/133314* (2013.01); *Y10T 29/49117* (2015.01)

(58) Field of Classification Search
CPC ................................................ G02F 1/133308
USPC .......................................................... 349/58
See application file for complete search history.

(56) References Cited

U.S. PATENT DOCUMENTS

2009/0173860 A1*  7/2009  Remy .......................... 248/278.1
2009/0184221 A1*  7/2009  Sculler ...................... 248/221.11
2014/0021312 A1*  1/2014  Nguyen ....................... 248/205.1

* cited by examiner

*Primary Examiner* — Timothy L Rude

(57) ABSTRACT

A liquid crystal display (LCD) module includes a backplane, and the backplane is configured with fixed beams to vertically fix the backplane.

8 Claims, 9 Drawing Sheets

LCD MODULE AND ASSEMBLING METHOD THEREOF

TECHNICAL FIELD

The present disclosure relates to the field of liquid crystal displays (LCDs), and more particularly to an LCD module and assembling method thereof.

BACKGROUND

A liquid crystal display (LCD) is widely used in life and work because the LCD has various characteristics such as being light weight, thin, and have a large display area. The LCD generally includes a backlight module, an LCD panel assembly, a front frame, and a printed circuit board.

As shown in FIG. 1, the backlight module 101 includes a light source assembly 110, a reflector plate 120, a light guide plate (or a diffuser plate) 130, a plurality of optical films 140 and a middle frame that fixes the optical films 140, and a power panel 160 that controls the light source assembly 110. The LCD panel assembly 170 includes an LCD panel 171, a flexible printed circuit board 172, and a signal timer-control printed circuit board 173. The LCD panel assembly 170 is fixed to the backlight module 101 via a front frame 180 to form an LCD module 100.

With development of lighter and thinner LCDs, people trend to choose LCDs having a larger display area, especially LCDs used in public places or during work. But a large-sized display is more difficult to assemble than a small-sized display. For example, generally, LCDs under sixty inches are integrally installed via a flat, flipping method. FIG. 2 shows a production and assembly procedures for the LCDs under sixty inches. Steps for assembling the LCDs under sixty inches comprises: a) horizontally placing the backplane and mounting the light source assembly on the backplane, b) flipping the LCD to a back surface, turning on the light source assembly, and checking whether it is qualified, c) flipping the LCD to a front surface and installing the reflector plate, the light guide panel, the optical films and the middle frame, d) installing the LCD panel assembly and the front frame, e) flipping the LCD to the back surface and installing various printed circuit boards, and, f) flipping the LCD to the front surface and checking the display. In the process, four flips of the LCD are needed. For television (TV) sets is over sixty inches, because of over-sized length and width, an operating distance has exceeded an ergonomic comfortable distance, if the LCD is installed via the flat, which reduces production efficiency. Besides, if the TV sets are flipped too many times, damage of the LCD module is increased.

SUMMARY

An aim of the present disclosure is to provide a method for installing a liquid crystal display (LCD) module with higher safety and efficiency.

The aim of the present disclosure is achieved by the following technical scheme. An LCD module comprises a backplane configured with a fixed beam to vertically fix the backplane.

In one example two fixed beams, arranged in parallel, are fixed onto the backplane, or three fixed beams are arranged on the backplane, the three fixed beams forming an H-shaped structure.

A method for installing the LCD module, comprising:

A1) installing a backlight module step comprising: vertically fixing the backplane and installing components of the backlight module on the backplane to finish installation of the backlight module;

A2) installing an LCD panel assembly step comprising: horizontally placing the installed backlight module and assembling the LCD panel assembly on the backlight module;

A3) installing a printed circuit board of the LCD module: vertically fixing the backlight module and the LCD panel assembly of the backlight module again and installing the printed circuit board.

In one example, in the step A1, installing the backlight module step comprises assembling a light source assembly, the light source assembly is locked to the vertical backplane. Each of the light source assembly is configured with a connecting wire and is connected to a power panel by the connecting wire, and thus this vertical state facilitates quick installation of the connecting wire.

In one example, in the step A1, installing the backlight module step comprises installing a diffuser plate. A bottom of the backplane is configured with a first positioning structure that positions edges of the diffuser plate, and when the diffuser plate is installed, one edge of the diffuser plate is first positioned on the first positioning structure. A arrangement mode can ensure that the diffuser plate is reliable fixed, which prevent the diffuser plate from falling of before a middle frame is installed.

In one example, the diffuser plate is fixed to the backplane via double sided tape. Using the double sided tape can improve reliability of installation of the diffuser plate.

In one example, in the step A1, installing the backlight module step comprises installing optical films. A second positioning structure is arranged on a top of the vertical backplane, the optical films are fixed to the second positioning structure in a suspension mode. In this way, the optical films can be temporarily fixed without horizontally placing the whole module to arrange the optical films, before a middle frame is installed.

In one example, in the step A1, installing the backlight module step comprises installing a middle frame. The middle frame is divided into a plurality of segments, and each of the segments is fixed to a side-wall of the backplane with a screw. Because of larger size of the middle frame, dividing into a plurality of the segments can make it install easily.

In one example, the step A2 further comprises looking a front frame to a side-wall of the horizontal backplane which conveniently installs the front frame on the horizontal module, when workers are installing, operating distance is more ergonomical.

In one example, the method for installing the LCD module further comprises step A4: turning on the LCD module to check if a display image of the LCD module is normal, which confirms that the LCD module is installed properly or damaged.

In the present disclosure, because the backplane of the LCD module is configured with the fixed beams that supports the backplane to maintain the backplane in a vertical state, the backlight module and an LCD assembly are installed during installation of the backplane when the backplane is in a vertical state. During installation of the LCD module, only two flips are required when the LCD assembly is installed, one flip in the step for horizontally installing the LCD assembly, another flip in the step for vertically reinstalling the printed circuit board. Frequencies of the flips reduces, which reduces probability that the LCD module is damaged during the installation of the LCD module. Besides, when the backlight module is installed, a vertical mounting mode is adopted, the workers can stand to operate, accessible distance in operation can be larger, so that the operation distance can accommodate ergonomic comfortable distance to increase efficiency of production.

Figure 1:
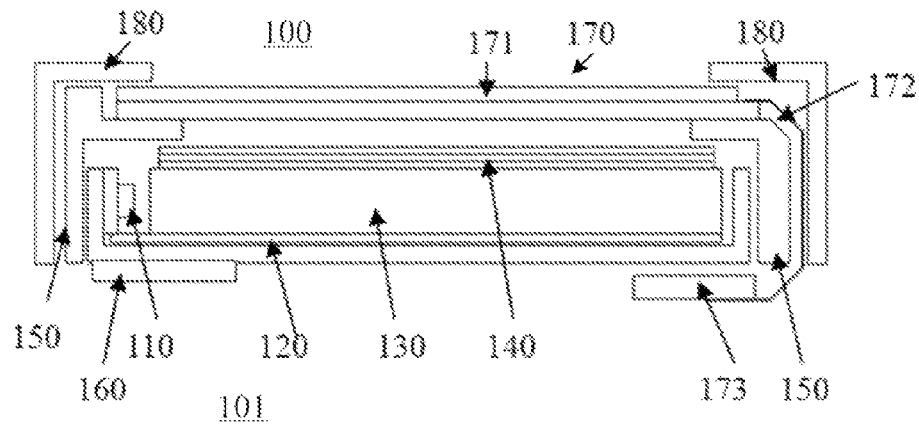
FIG. 1 is a simplified structural diagram of a typical liquid crystal display (LCD) module.
Figure 2:
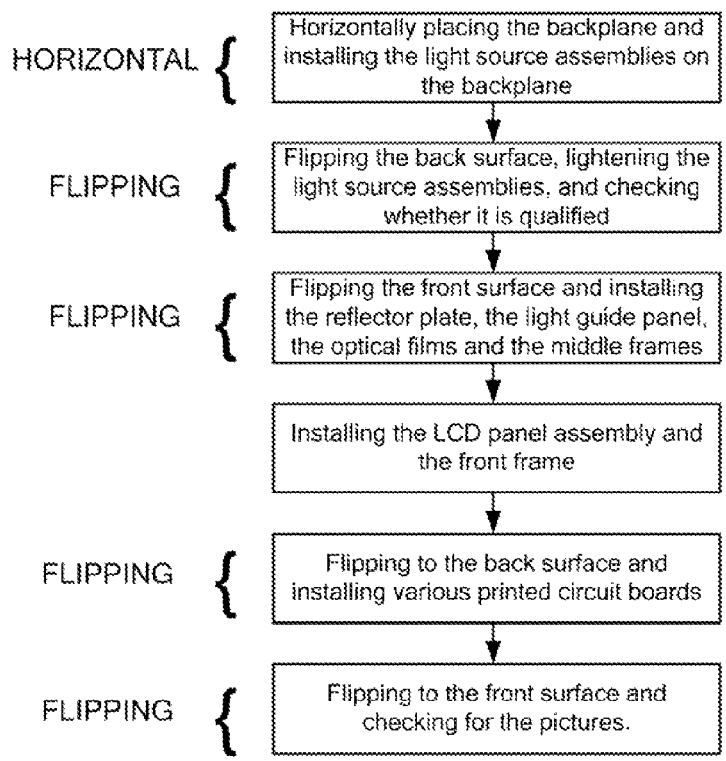
FIG. 2 is a flow diagram of installation of a typical liquid crystal display (LCD) module.

Marks of FIG. 1:
100. LCD module; 101. backlight module; 110. tight source assembly; 120. reflector plate; 130. diffuser plate; 140. optical film; 150. middle frame; 160. power panel; 170. LCD panel assembly; 171. LCD panel; 172. flexible printed circuit board; 173. timer-control printed circuit board; 180. front frame.

Marks of FIG. 4 to FIG. 17: 300. backlight module; 310. backplane; 311. fixed beam; 200. foot pedestal; 320. light source assembly; 330. reflector plate; 340. diffuser plate; 350. optical film; 360. middle frame; 400. LCD module; 410. LCD panel assembly; 411. printed circuit board; 420. front frame; 430. first printed circuit board; 440. second printed circuit board; 450. wire.

DETAILED DESCRIPTION

The present disclosure will further be described in detail in accordance with the figures and the examples.

Example 1

This embodiment illustrates the present disclosure using a direct-light liquid crystal display (LCD) module (over sixty inches) as an example.

Figure 4:
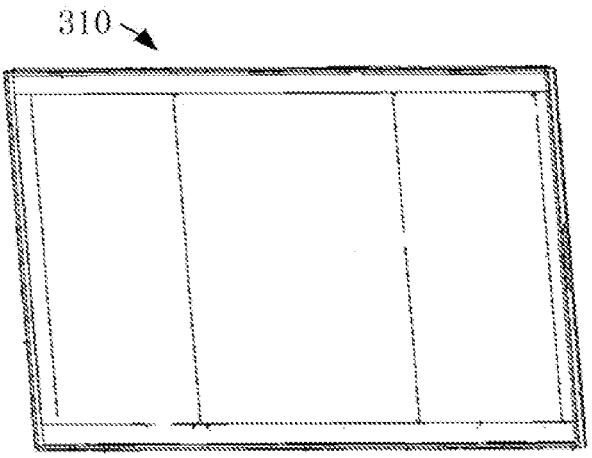
FIG. 4 is a structural diagram of a backplane of a first example of the present disclosure.

As shown in FIG. 4, when the LCD module is installed, a backplane of the LCD module is first installed. In order to improve strength of the LCD module, the backplane 310 is formed by one or more pieces backplane formed by riveting, welding, locking through screws, etc. The backplane 310 of this embodiment comprises a structure spliced by a plurality of rectangular splicing blocks. FIG. 4 only shows a spliced backplane structure of the backplane, but the present disclosure should is not only limited to the spliced backplane structure.

Figure 5:
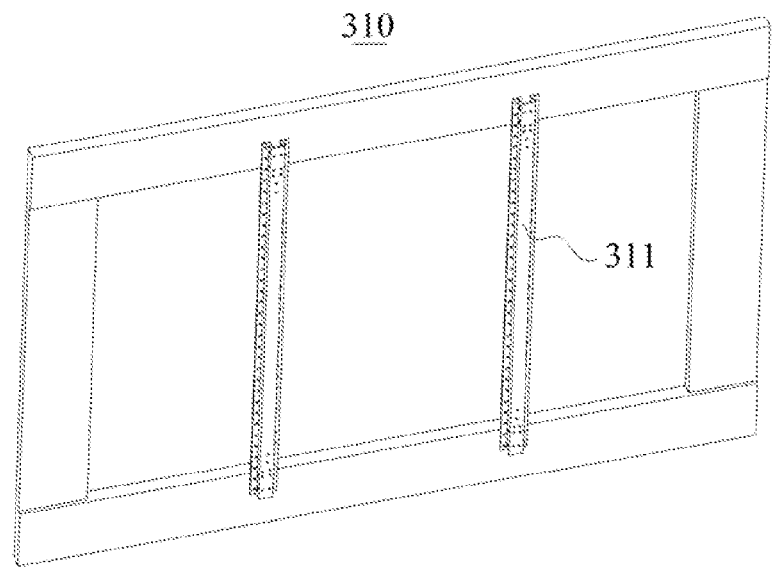
FIG. 5 is a structural diagram of a backplane of a first example of the present disclosure.
Figure 17:
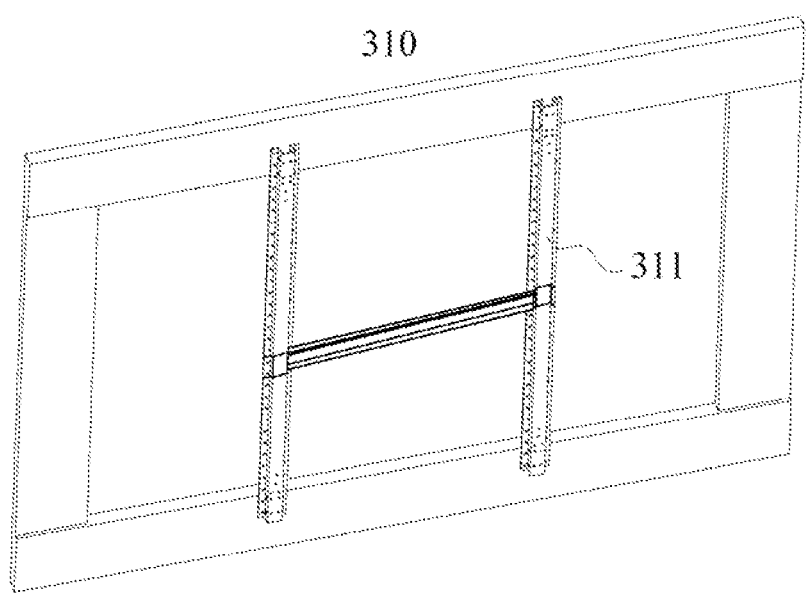
FIG. 17 is a structural diagram of another backplane of a first example or a second example of the present disclosure.

As shown in FIG. 5, two fixed beams 311 arranged in parallel are fixed onto as back surface of the backplane 310, the fixed beams 311 can improve strength of the spliced backplane and steadily support an LCD device during installing. The fixed beams 311 define hanging holes (not shown in this figure), so that the hanging holes can be used as a hanging device of the LCD device, without configuring to other hanging devices. As shown in FIG. 17, in order to improve support strength of the fixed beams 311, one fixed beam is arranged between the two fixed beams 311 arranged in parallel to form an H-shaped fixed beam structure, which improves support strength of the fixed beams and also enhances structural strength of the backplane.

Once backplane is installed, the LCD module is installed, comprising:

Step A1: Vertically Fixing the Backplane and Assembling the Backlight Module.

Figure 6:
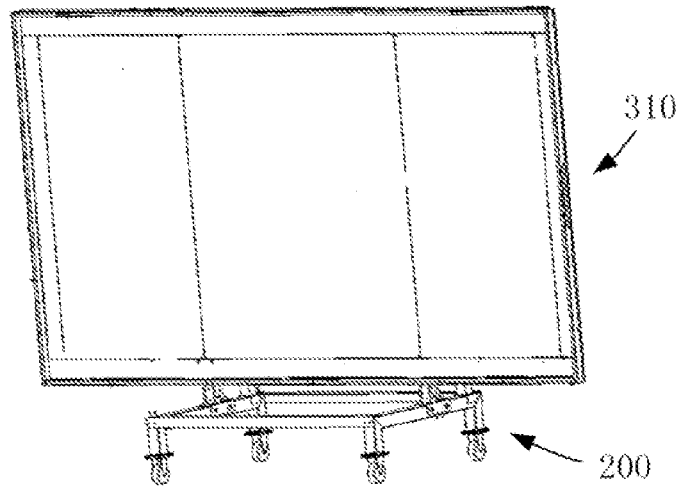
FIG. 6 shows the first step of installation of a backlight module of a first example of the present disclosure.

The backplane can be installed and processed on a platform, as shown in FIG. 6, the processed backplane 310 is fastened to a movable foot pedestal 200, the fixed beam on the back surface of the backplane 310 defines hanging holes (not shown in this figure), the backplane 310 and the foot pedestal 200 can be locked by the hanging holes to fix the backplane 310 to the foot pedestal 200, so that the backplane 310 can be supported and maintained in a vertical state. The foot pedestal 200 is configured with an all-around wheel, which facilitates transport of the backlight module in the assembly process and in choosing a installation position.

Figure 7:
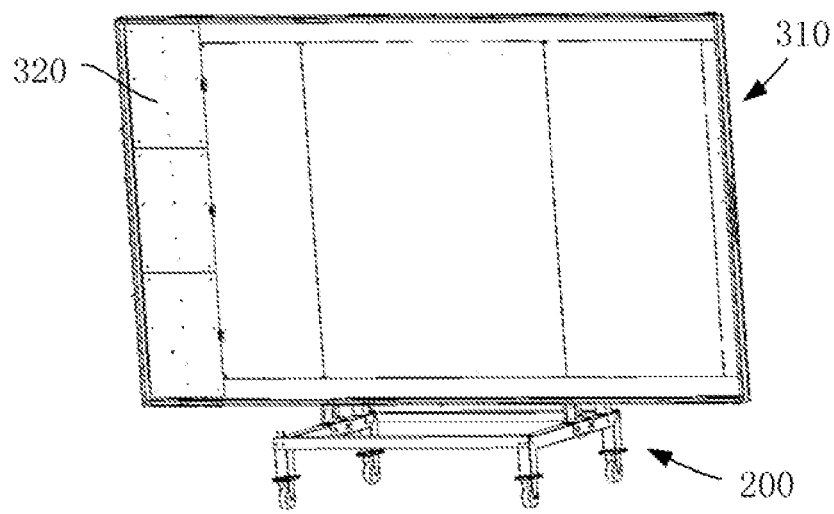
FIG. 7 shows the steps of installation of a light source assembly of a first example of the present disclosure.

As shown in FIG. 7, when the backplane 310 is vertically fixed, a plurality of light source assemblies 320 are installed and attached to a side surface of the backplane 310, each of the light source assemblies 320 is configured with a connecting wire and is connected to a power panel by the connecting wire, and thus this vertical state facilitates quick installation of the connecting wire. After the light source assemblies 320 is installed, the light source assemblies 320 are turned on to check whether the light source assemblies are normal.

Figure 8:
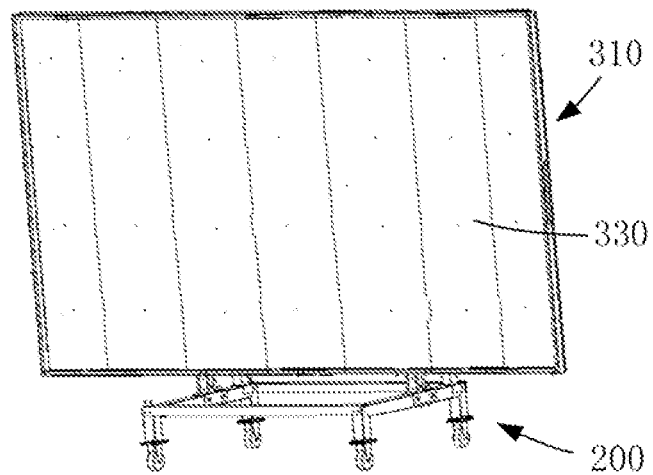
FIG. 8 shows the steps of installation of a reflector plate of a first example of the present disclosure.

As shown in FIG. 8, after the light source assemblies are installed, a reflector plate 330 is installed. The reflector plate 330 is divided into a plurality of segments. The reflector plate of this embodiment is formed by a plurality of rectangular segments, which can reduce cost of the reflector plate. The reflector plate 330 defines a opening hole on the corresponding positions of the LED (not shown in this figure) where the LEDs are corresponded to the light source assemblies. The reflector plate 330 is fastened to surfaces of the light source assemblies by double sided tape.

Figure 9:
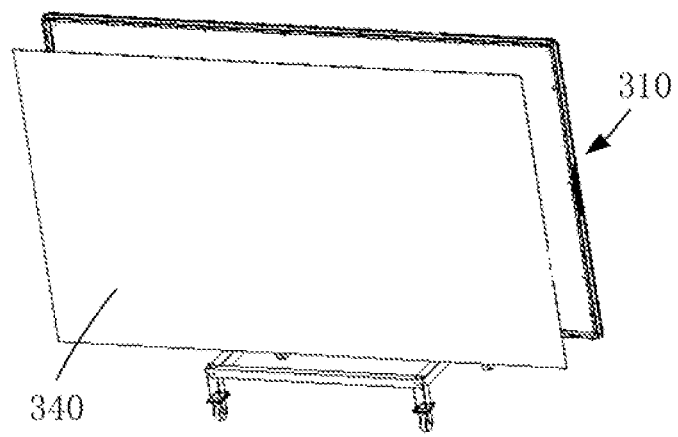
FIG. 9 shows the steps of installation of a diffuser plate of a first example of the present disclosure.

As shown in FIG. 9, after the reflector plate is installed, the diffuser plate 340 is installed. A first positioning structure (not shown in this figure) is arranged at a bottom of the vertical backplane 310, one edge of the diffuser plate 340 is arranged against the first positioning structure, the first positioning structure is a neck or a lug at the bottom of the vertical backplane to position the edges of the diffuser plate and the diffuser plate 340 is bonded to the diffuser plate 340 via the double sided tape, which prevents the diffuser plate 340 from falling off from the backplane 310.

Figure 10:
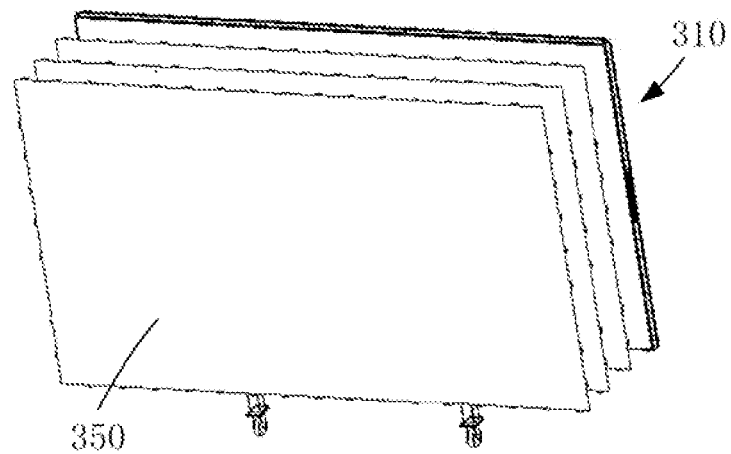
FIG. 10 shows the steps of installation of the optical films of a first example of the present disclosure.

As shown in FIG. 10, after the diffuser plate 340 is installed, the optical films 350 are installed. A plurality of optical films 350 are arranged in the backlight module. In installing the optical films 350, the optical films 350 are hanged on a second positioning structure (not shown in this figure) on the top of the backplane 310 in a suspension mode, such as, hooks or buckle clamps are used to fix at the top of the optical films 350. In this way, the optical films can be temporarily fixed without horizontally placing the whole module to arrange the optical films, before a middle frame is installed.

Figure 11:
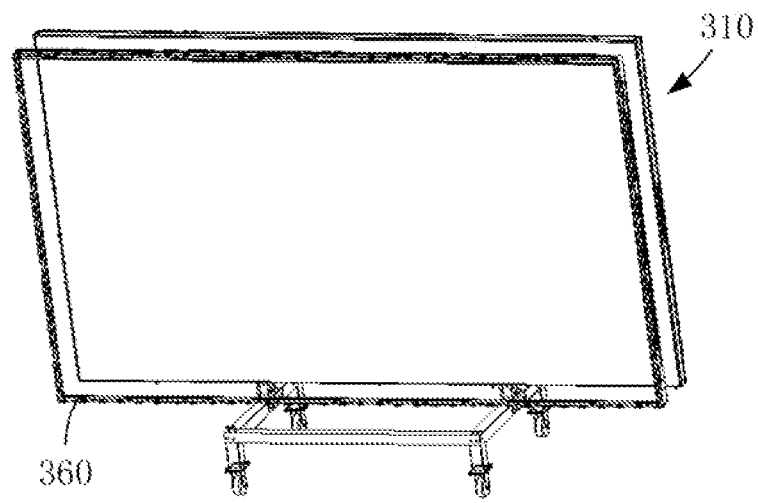
FIG. 11 shows the steps of installation of a first example of the present disclosure.
Figure 12:
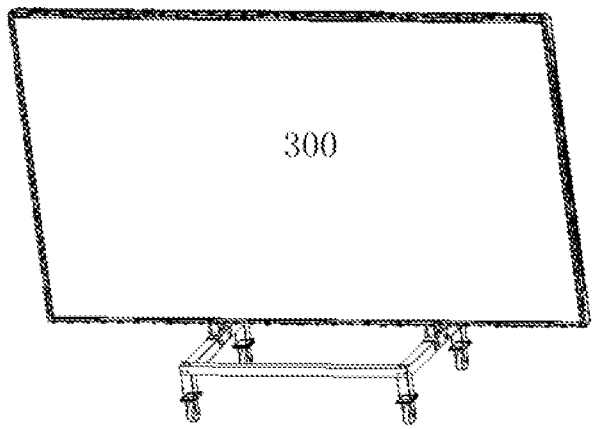
FIG. 12 shows an installed backlight module of a first example of the present disclosure.

As shown in FIG. 11, after the optical films are installed, the middle frame 360 is installed. The middle frame 360 is generally made of plastic, and because the LCD module is over-sized, the plastic middle frame 360 is divided into a plurality of sections to form a multi-section middle frame which is convenient to install. On the vertical backplane 310, a plurality of sections of the middle frame 360 are successively installed on the backplane 310 via screws. As shown in FIG. 12, after the middle frame 360 is installed, the components of the backlight module 300 are installed.

Step A2: Installing an LCD Panel Assembly, Horizontally Placing the Installed Backlight Module, and Installing the LCD Panel Assembly on the Backlight Module.

Figure 13:
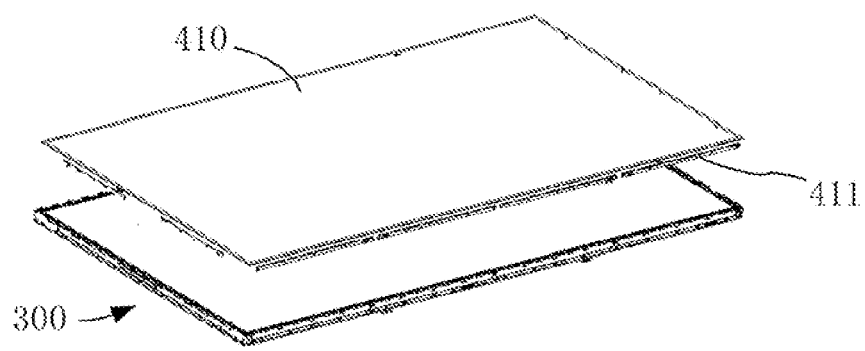
FIG. 13 shows the steps of installation of a liquid crystal display (LCD) panel assembly of a first example of the present disclosure.

As shown in FIG. 13, after the movable foot pedestal is removed from the installed backlight module, the installed backlight module is arranged on a flat platform (not shown in this figure), which is a first of the LCD module in installing, the first flip of the LCD module can be achieved by a machine flip platform used as a supporting platform in a horizontal position. Then, the LCD panel assembly 410 is installed, the printed circuit board 411 of the LCD panel assembly 410 is fixed, and installation of the LCD panel assembly is finished.

Figure 14:
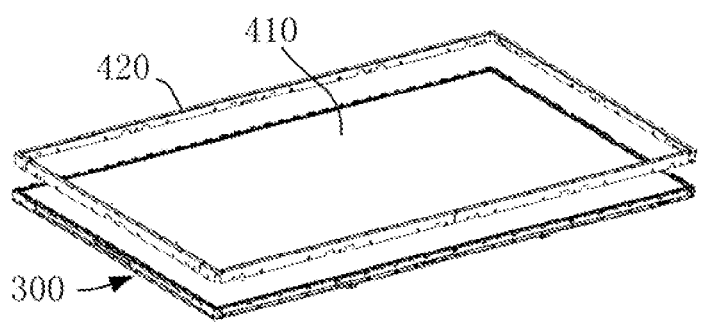
FIG. 14 shows the steps of installation of a front frame of a first example of the present disclosure.
Figure 15:
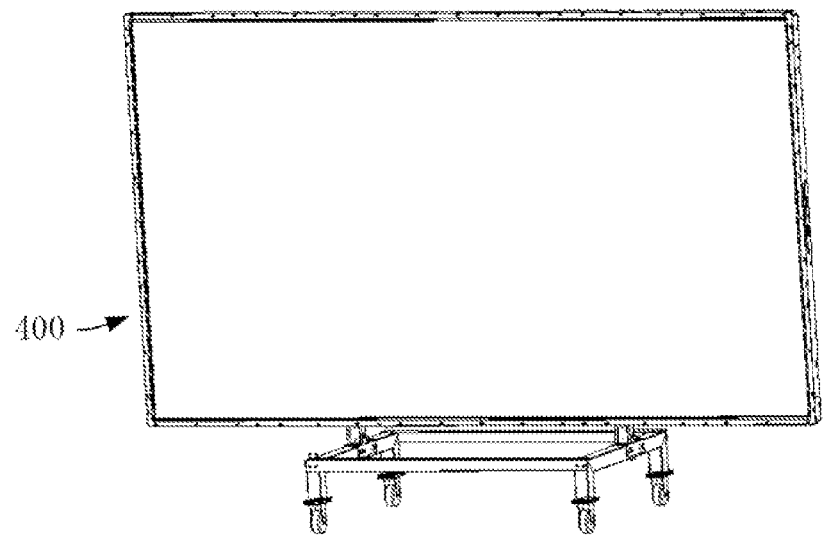
FIG. 15 shows an installed liquid crystal display (LCD) module of a first example of the present disclosure.

As shown in FIG. 14, after the LCD panel assembly 410 is installed, a front frame 420 is installed. The front frame 420 is locked to the backplane of the backlight module 300 in horizontally state, thus, the LCD module 400 as shown in FIG. 15 is formed.

Step A3: Installing the Printed Circuit Boards of the LCD Module, Vertically Fixing the Backlight Module and the LCD Panel Assembly of the Backlight Module Again, and Installing the Printed Circuit Board.

Figure 16:
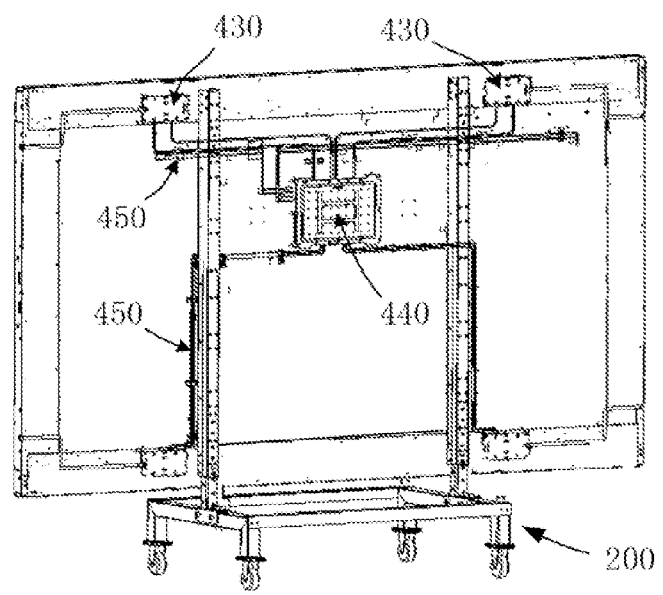
FIG. 16 shows the steps of installation of the printed circuit boards and the wires of a liquid crystal display (LCD) module of a first example of the present disclosure.

As shown in FIG. 16, after the front frame 420 is installed, a first printed circuit board 430, a second printed circuit board 440 and the corresponding wires 450 are installed. The LCD module 400 is erected again and fixed with the movable foot pedestal 200, which is a second flip. Then, the first printed circuit hoard 430, the second printed circuit hoard 440 and the corresponding wires 450 are installed. The printed circuit boards are installed in the vertical state and the operating distance is more ergonomical, which improve efficiency.

At last, the LCD module is turned on to check if a display image of the LCD module is normal, if the display image of the LCD module is normal, the installation of the LCD module is completed.

Example 2

The LCD module of this embodiment adopts a edge-light mode. A difference between the two examples is that, in the second example, the light source assemblies are fastened to side-walls of the backplane and a light guide plate converts edge-light into a surface light source, but in the first example, the light source assemblies are arranged on the surface of the backplane.

Figure 3:
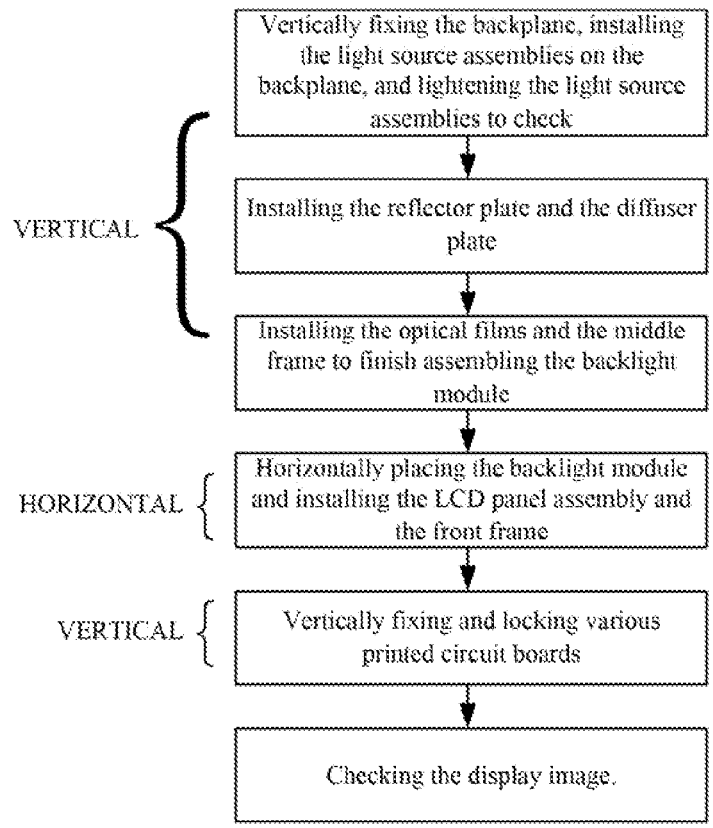
FIG. 3 is a flow diagram of installation of a liquid crystal display (LCD) module of the present disclosure.

As shown in FIG. 3, the installing process of the present disclosure can comprise:

a1) vertically fixing the backplane, installing the light source assemblies on the backplane, and turning on the light source assemblies to check;

a2) stalling the reflector plate and the diffuser plate;

a3) installing the optical films and the middle frame;

a4) horizontally placing the backlight module and installing the LCD panel assembly and the front frame;

a5) vertically fixing and locking various printed circuit boards;

a6) checking a display image of the LCD module.

In the steps a1 to a3, the LCD module is in as vertical state; in the step a4, the LCD module is horizontally arranged on a platform, and in the steps a5 to a6, the LCD module is in the vertical state. Only two flips are required in this whole process, which reduces probability that the LCD module is damaged during flipping and moving.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

We claim:

1. A method for assembling a liquid crystal display (LCD) module, comprising:
    A1) Assembling a backlight module: vertically fixing a backplane and assembling the components of the backlight module on the backplane to finish assembling the backlight module;
    A2) Assembling an LCD panel assembly: horizontally placing the assembled backlight module and assembling the LCD panel assembly on the backlight module;
    A3) Assembling the printed circuit boards of the LCD module: vertically fixing the backlight module and the LCD panel assembly thereon again and installing the printed circuit board.

2. The method for assembling a liquid crystal display (LCD) module of claim 1, wherein, in said step A1, assembling the backlight module comprises assembling a light source assembly, that is, on the vertical backplane, said light source assembly is locked to the backplane.

3. The method for assembling a liquid crystal display (LCD) module of claim 1, wherein, in said step A1, assembling the backlight module comprises assembling a diffuser plate, a first positioning structure for positioning the edges of said diffuser plate is arranged below said vertical backplane, and when the diffuser plate is assembled, one edge of the diffuser plate is positioned on the first positioning structure below the backplane, firstly.

4. The method for assembling a liquid crystal display (LCD) module of claim 3, wherein, said diffuser plate is fixed to the backplane using a double sided tape to assist in positioning when said diffuser plate is positioned.

5. The method for assembling a liquid crystal display (LCD) nodule of claim 1, wherein, in said step A1, assembling the backlight module comprises assembling the optical films, a second positioning structure is arranged on the top of said vertical backplane, and said optical films are fixed to the second positioning structure in a suspension mode.

6. The method for assembling a liquid crystal display (LCD) module of claim 1, wherein, in said step A1, assembling the backlight module comprises assembling the middle frames, that is, said middle frames are divided into a plurality of segments, each segment is fixed to a side wall of the backplane with a screw, respectively.

7. The method for assembling a liquid crystal display (LCD) module of claim 1, wherein, said step A2 further comprises locking a front frame to the side wall of the horizontal backplane.

8. The method for assembling a liquid crystal display (LCD) module of claim 1, wherein, said method further comprises the step A4: lightening the LCD module to check whether the display of the pictures is normal.

* * * * *